US007068665B2

(12) United States Patent
Lee (10) Patent No.: US 7,068,665 B2
(45) Date of Patent: Jun. 27, 2006

(54) SYSTEM AND METHOD FOR SWITCHING CELLS IN A COMMUNICATIONS NETWORK

(75) Inventor: Kwang Il Lee, Wolsankwangyeok-shi (KR)

(73) Assignee: LG Electronics Inc., Seoul (KR)

( * ) Notice: Subject to any disclaimer, the term of this patent is extended or adjusted under 35 U.S.C. 154(b) by 850 days.

(21) Appl. No.: 09/997,238

(22) Filed: Nov. 30, 2001

(65) Prior Publication Data

US 2002/0089988 A1     Jul. 11, 2002

(30) Foreign Application Priority Data

Dec. 4, 2000  (KR)  ............................ 2000-0072989

(51) Int. Cl.
*H04L 12/56* (2006.01)

(52) U.S. Cl. .................. 370/395.6; 370/905; 370/474; 370/466

(58) Field of Classification Search ............. 370/395.6, 370/395.64, 395.65, 401, 905, 474, 466
See application file for complete search history.

(56) References Cited

U.S. PATENT DOCUMENTS

| 5,953,339 | A | * | 9/1999 | Baldwin et al. | ............. 370/397 |
| 6,108,336 | A | * | 8/2000 | Duault et al. | ............. 370/395.6 |
| 6,396,840 | B1 | * | 5/2002 | Rose et al. | ................. 370/401 |
| 6,445,683 | B1 | * | 9/2002 | Nobuyasu et al. | ........ 370/310.1 |
| 6,483,838 | B1 | * | 11/2002 | Ostman et al. | ........ 370/395.31 |
| 6,574,226 | B1 | * | 6/2003 | Nakano et al. | ......... 370/395.64 |
| 6,603,767 | B1 | * | 8/2003 | Murakami et al. | ...... 370/395.64 |
| 6,829,241 | B1 | * | 12/2004 | Lee | ......................... 370/395.64 |
| 6,834,053 | B1 | * | 12/2004 | Stacey et al. | ............. 370/395.4 |

* cited by examiner

*Primary Examiner*—Ricky Q. Ngo
*Assistant Examiner*—Nguyen H. Ngo
(74) *Attorney, Agent, or Firm*—Fleshner & Kim, LLP (57) ABSTRACT

Disclosed is an asynchronous transfer mode relating to a cell switching method, a cell format converter thereof, and a switching system thereof which are proper for switching an AAL2 ATM cell and an AAL5 ATM cell using an AAL2/AAL5 converter and an AAL5/AAL2 converter. Namely, AAL2 traffic may be switched at an AAL level using the AAL2/AAL5 and AAL5/AAL2 converters, so as to increase a system efficiency and provide a flexible interface between AAL2 and AAL5 protocol.

26 Claims, 6 Drawing Sheets

FIRST VPCT

| input | output |
|---|---|
| VP/VC & CID #1 | New VP/VC #1 |
| VP/VC & CID #2 | New VP/VC #2 |
| VP/VC & CID #3 | New VP/VC #3 |
| ⋮ | ⋮ |
| VP/VC & CID #N−1 | New VP/VC #N−1 |
| VP/VC & CID #N | New VP/VC #/N |

FIG. 4B

SECOND VPCT

| input | output |
|---|---|
| VP/VC #1 | NEW VP/VC & CID #1 |
| VP/VC #2 | NEW VP/VC & CID #2 |
| VP/VC #3 | NEW VP/VC & CID #3 |
| ⋮ | ⋮ |
| VP/VC #N−1 | NEW VP/VC & CID #N−1 |
| VP/VC #N | NEW VPNC & CID #N |

SYSTEM AND METHOD FOR SWITCHING CELLS IN A COMMUNICATIONS NETWORK

BACKGROUND OF THE INVENTION

1. Field of the Invention

The present invention relates to communications, and more particularly, to a cell switching method and a cell switching system thereof.

2. Background of the Related Art

Generally, an asynchronous transfer mode (hereinafter abbreviated ATM) system preforms the steps of dividing user traffic into fixed-size packets, called cells, wherein destination information is placed into a 5 byte header, payload information is placed into 48 bytes, and the ATM system transfers the 53 byte cells to a destination.

Like telephone networks, ATM is a connection-based approach to communication. Thus, a fixed path (or virtual connection) is established from a point of origination to a destination by controlling the state of intermediate switches.

A protocol for transferring packet data in such an ATM system includes a physical layer, an ATM layer, an AAL (ATM adaptation layer), and an upper layer. The AAL is a layer for dividing and reassembling the packet data transferred from the upper layer, and is defined by types AAL1 to AAL5 (referring to ITU-TI series recommendation). AAL2 refers to variable bit rate service and AAL5 refers to connection-oriented data service.

The AAL2 protocol reduces the time required for packing each short user data into an ATM cell by multiplexing short packets transferred from various users on an ATM network over the same virtual connection, thereby optimizing the bandwidth of the ATM network. Namely, a basic concept of the AAL2 protocol is to multiplex or otherwise assemble various user data, which have short and variable lengths, into common part sublayer (CPS) packets.

Figure 1:
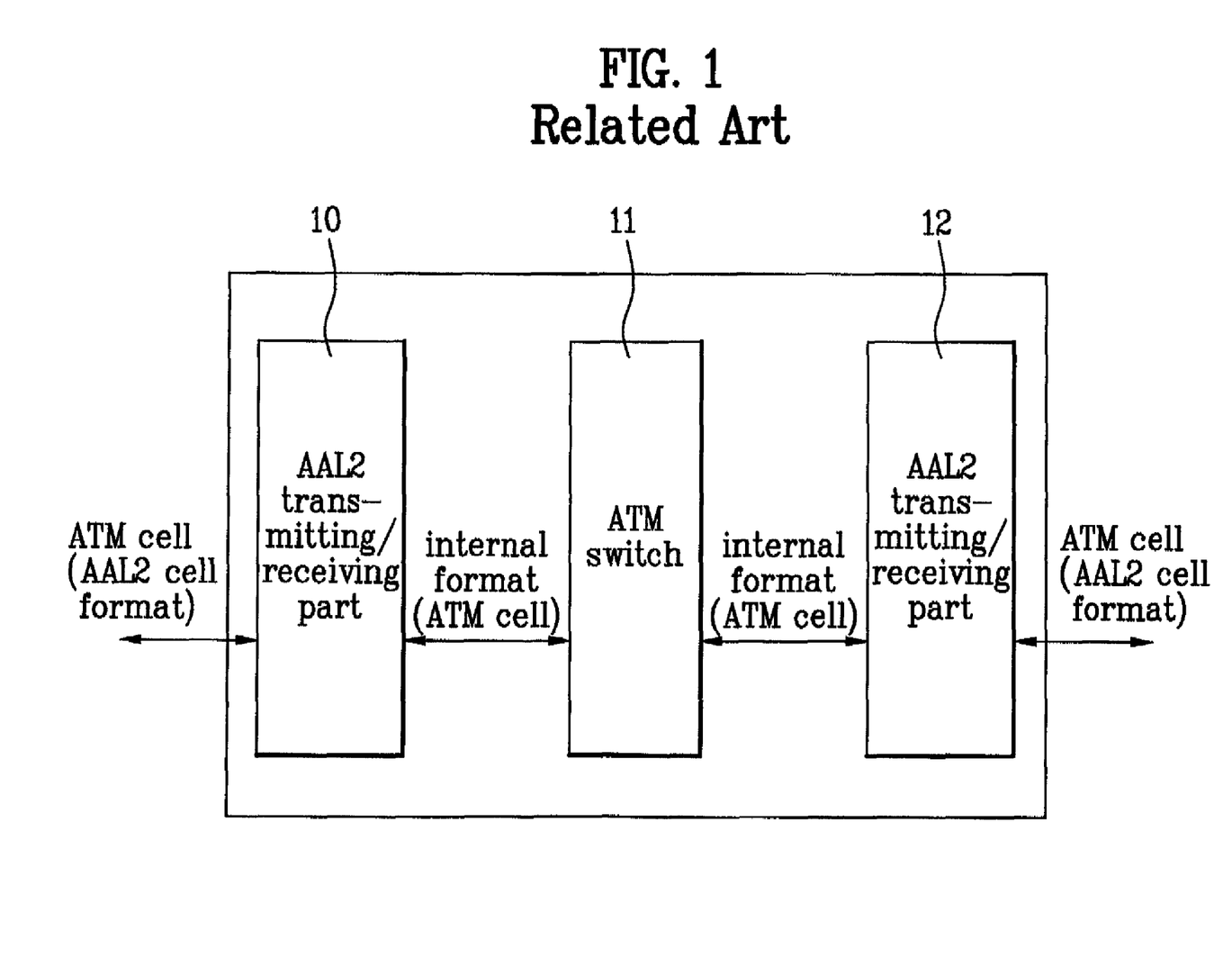
FIG. 1 is a diagram of an AAL2 switch according to the related art.

FIG. 1 illustrates a block diagram of an AAL2 switch according to the related art. An AAL2 switch according to the related art includes AAL2 transceiver units 10 and 12 for demultiplexing or multiplexing the inputted AAL2 packet, and a switch 11 for switching an ATM cell at an ATM level.

An operation of the above-constructed AAL2 switch is as follows. First, an AAL2 receiving block in the AAL2 transceiver unit 10 demultiplexes the inputted AAL2 CPS packets into an ATM cell of 53 bytes. Thereafter, the AAL2 receiving block transfers the converted ATM cell to the ATM switch 11. Successively, the ATM switch 11 transfers the ATM cell to an AAL2 transmitting unit in AAL2 transceiver 12. Then, the AAL2 transmitting unit parses and multiplexes the ATM cell into AAL2 CPS packets so as to transmit the packets to a specified destination.

Figure 2:
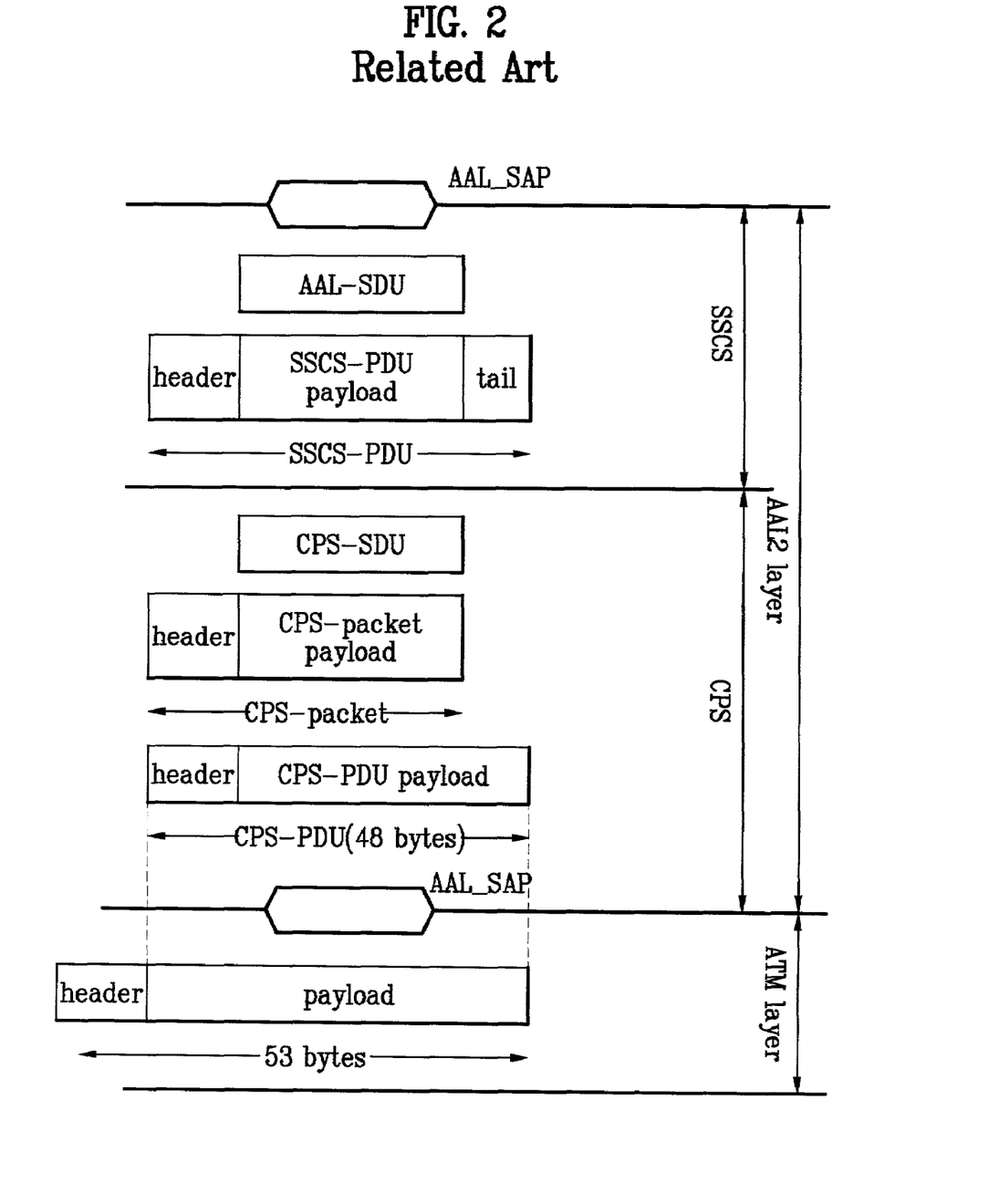
FIG. 2 is a diagram for explaining an AAL2 protocol recommended by ITU-T according to the related art.

FIG. 2 is a block diagram for describing an AAL2 protocol recommended by ITU-T, according to the related art. An AAL2 protocol is divided into a Service Specific Convergence Sublayer hereinafter abbreviated SSCS) and a Common Part Sublayer (hereinafter abbreviated CPS).

Packet data of an upper application layer in the form of Service Data Units (hereinafter abbreviated SDU's) is transferred to an AAL layer through a Service Access Point (SAP). An AAL2 protocol SSCS then generates a SSCS-PDU (Protocol Data Unit) by adding a header and tail to the SDU.

Successively, the CPS generates a CPS-packet by adding a CPS-header to the SSCS-PDU (or CPS-SDU) transferred from the upper layer, and generates a CPS-PDU of 48 bytes by adding a start field to the CPS-packet. In this case, the CPS-packet becomes a payload of the CPS-PDU. As CPS-PDU comprises 48 bytes, CPS-packets of a plurality of users are multiplexed into the payload of a single CPS-PDU.

Subsequently, the CPS-PDU is transferred to an ATM layer. The ATM layer generates an ATM cell having a total size of 53 bytes by adding a 5 byte header of destination information to the CPS-PDU. Thus, the packet data received from the upper layer are divided/assembled into 48 bytes respectively through the AAL2 protocol so as to be used for the payload of the ATM cell.

The related art ATM switch and method thereof has various problems. For example, in order to switch the AAL2 CPS packets, the related art ATM switches convert the AAL2 cell into a ATM cell, switches the ATM cell to the corresponding destination, and then re-converts the ATM cell into AAL2 CPS packets again, thereby complicating the process, and resulting in processing delays. Moreover, the overhead of such an AAL2 switch degrades the Quality of Service (QoS) of a cell, reducing system efficiency.

The above references are incorporated by reference herein where appropriate for appropriate teachings of additional or alternative details, features and/or technical background.

SUMMARY OF THE INVENTION

An object of the present invention is to solve at least the above problems and/or disadvantages and to provide at least the advantages described hereinafter. Accordingly, the present invention is directed to a cell switching method and a cell switching system thereof.

Another object of the present invention is to provide a cell switching method and a cell switching system thereof that increases a system efficiency by switching an AAL2 traffic at an AAL level using an AAL2/AAL5 converter and an AAL5/AAL2 converter.

Another object of the present invention is to provide a cell switching method and a cell switching system thereof that provides a flexible ATM connection between an AAL2 protocol and an AAL5 protocol.

To achieve at least the above objects in whole or in parts and in accordance with the purpose of the invention, as embodied and broadly described herein, a cell switching system in a communication system using an asynchronous transfer mode (ATM) is provided, including, a first converter configured to extract AAL2 type common part sublayer (CPS) packets by demultiplexing a received AAL2 type ATM cell, and generate an AAL5 type ATM cell in accordance with a first transforming information for the extracted AAL2 type CPS packets, and a second converter coupled to the first converter and configured to generate an AAL2 CPS packet from AAL5 type ATM cell in accordance with a second transforming information and generate an AAL2 ATM cell by multiplexing the generated AAL2 CPS packet with other AAL2 CPS packets.

To further achieve at least the above objects in whole or in part and in accordance with the purpose of the invention, as embodied and broadly described herein, a cell switching system in a communication system using an asynchronous transfer mode (ATM) is provided, including, a first converter configured to separate an inputted ATM cell into AAL2 type common part sublayer (CPS) packets and first virtual path/virtual channel (VP/VC) and first channel identifier (CID), generate AAL5 type ATM cells by allocating a second VP/VC to the separated AAL2 CPS packets, and having a first table provided with reference values for allocating the second VP/VC, and a second converter configured to separate one of the generated and externally-inputted AAL5 type ATM cell into third VP/VC and data, generate an AAL2 CPS packet by allocating a fourth VP/VC and second CID to the separated data, generate an AAL2 ATM cell by multiplexing a plurality of AAL2 CPS packets, and having a second table provided with reference values for allocating the fourth VP/VC and second CID to the separated data.

To further achieve at least the above objects in whole or in part and in accordance with the purpose of the invention, as embodied and broadly described herein, a cell switching system in a communication system using an asynchronous transfer mode (ATM is provided, including, a first converter configured to separate an inputted ATM cell into AAL2 type common part sublayer (CPS) packets and first virtual path/virtual channel (VP/VC) and first channel identifier (CID), generate AAL5 type ATM cells by allocating second VP/VC to the separated AAL2 type CPS packets, and having a first table provided with first reference values for allocating the second VP/VC, a second converter configured to separate one of the generated and externally-inputted AAL5 type ATM cell into third VP/VC and data, generate an AAL2 CPS packet by allocating fourth VP/VC and second CID to the separated data, generate an AAL2 ATM cell by multiplexing a plurality of AAL2 CPS packets, and having a second table provided with second reference values for allocating fourth VP/VC and second CID to the separated data, a third converter configured to separate the generated or externally-inputted AAL5 ATM cell into fifth VP/VC and data, generate an AAL2 CPS packet by allocating sixth VP/VC and third CID to the separated data, generate an AAL2 ATM cell by multiplexing AAL2 CPS packets generated by each user, and having a third table provided with third reference values for allocating the sixth VP/VC and the third CID to the separated data wherein the third reference values are attained by switching input/output from the second table, and a fourth converter configured to separate an inputted ATM cell into AAL2 type CPS packets and seventh VP/VC and fourth CID, generate AAL5 type ATM cells by allocating eighth VP/VC to the separated AAL2 CPS packets, provide the second and third converters with the AAL5 type ATM cells or outputting the AAL5 type ATM cells to an outside port, and having a fourth table provided with fourth reference values for allocating the eighth VP/VC, wherein the fourth reference values are attained by switching the input/output from the second table.

To further achieve at least the above objects in whole or in part and in accordance with the purpose of the invention, as embodied and broadly described herein, a cell switching system in a communication system using an asynchronous transfer mode (ATM) is provided, including, a first converter configured to separate an inputted ATM cell into AAL2 type common part sublayer (CPS) packets and first virtual path/virtual channel (VP/VC) and first channel identifier (CID), generate AAL5 type ATM cells by allocating second VP/VC to the separated AAL2 type CPS packets, and having a first table provided with reference values for allocating the second VP/VC, a second converter configured to separate or of the generated and externally-inputted AAL5 type ATM cell into third VP/VC and data, generate an AAL2 CPS packet by allocating fourth VP/VC and second CID to the separated data, generate an AAL2 ATM cell by multiplexing a plurality of AAL2 CPS packets, and having a second table provided with reference values for allocating the fourth VP/VC and second CID to the separated data, and a multiplexer/demultiplexer configured to multiplex AAL2 ATM cells or AAL5 ATM cells inputted through corresponding ports so as to provide the first and second converters with the multiplexed cells and to demultiplex the generated AAL5 ATM cells or AAL2 ATM cells so as to output the demultiplexed cells to the corresponding ports.

To further achieve at least the above objects in whole or in part and in accordance with the purpose of the invention, as embodied and broadly described herein, a cell switching system in a communication system using an asynchronous transfer mode (ATM) is provided, including, a first converter configured to separate an inputted ATM cell into AAL2 type common part sublayer (CPS) packets and first virtual path/virtual channel (VP/VC) and first channel identifier (CID), generate AAL5 type ATM cells by allocating a second VP/VC to the separated AAL2 CPS packets, and having a first table provided with first reference values for allocating the second VP/VC, a second converter configured to separate one of the generated and externally-inputted AAL5 type ATM cell into third VP/VC and data, generate an AAL2 CPS packet by allocating fourth VP/VC and second CID to the separated data, generate an AAL2 ATM cell by multiplexing a plurality of AAL2 CPS packets, and having a second table provided with second reference values for allocating the fourth VP/VC and second CID to the separated data, a third converter configured to separate the generated or externally-inputted AAL5 type ATM cell into fifth VP/VC and data, generate an AAL2 CPS packet by allocating sixth VP/VC and third CID to the separated data, generate an AAL2 ATM cell by multiplexing AAL2 CPS packets generated by each user, and having a third table provided with third reference values for allocating the sixth VP/VC and the third CID to the separated data wherein the third reference values are attained by switching input/output from the second table, a fourth converter configured to separate an inputted ATM cell into AAL2 type CPS packets and seventh VP/VC and fourth CID, generate AAL5 type ATM cells by allocating eighth VP/VC and CID to the separated AAL2 CPS packets, provide the second and third converters with the AAL5 type ATM cells or outputting the AAL5 type ATM cells to an outside port, and having a fourth table provided with fourth reference values for allocating the eighth VP/VC wherein the fourth reference values are attained by switching the input/output from the second table, and a multiplexer/demultiplexer configured to multiplex at least one of AAL2 ATM cells and AAL5 ATM cells inputted through corresponding ports so as to provide the converters with the multiplexed cells and to demultiplex the generated AAL5 ATM cells or AAL2 ATM cells so as to output the demultiplexed cells to the corresponding ports.

To further achieve at least the above objects in whole or in part and in accordance with the purpose of the invention, as embodied and broadly described herein, a method for switching cells in a communication system using an asynchronous transfer mode (ATM) is provided, including, extracting a first AAL2 type common part sublayer (CPS) packets by demultiplexing a first AAL2 type ATM cell, generating an AAL5 type ATM cell in accordance with virtual path/virtual channel (VP/VC) and channel identifier (CID) transforming information for the extracted AAL2 CPS packets and generating a second AAL2 CPS packet from the AAL5 type ATM cell in accordance with the VP/VC transforming information and generating a second AAL2 type ATM cell by multiplexing the second AAL2 CPS packet with at least one other AAL2 CPS packet.

To further achieve at least the above objects in whole or in part and in accordance with the purpose of the invention, as embodied and broadly described herein, a method for switching cells in a communication system using an asynchronous transfer mode (ATM is provided, including, separating an inputted ATM cell into at least one first AAL2 type common part sublayer (CPS) packets and first virtual path/ virtual channel (VP/VC) and first channel identifier (CID), at least one of generating AAL5 type ATM cells by allocating second VP/VC to the separated AAL2 CPS packets instead of the first VP/VC and first CID and receiving an external AAL5 type ATM cell, separating the AAL5 type ATM cell into second VP/VC and data, and generating a second AAL2 CPS packet by allocating third VP/VC and second CID to the separated data instead of the second VP/VC, and generating an AAL2 ATM cell by multiplexing a plurality of AAL2 CPS packets.

To further achieve at least the above objects in whole or in part and in accordance with the purpose of the invention, as embodied and broadly described herein, a method for switching cells in a communication system using an asynchronous transfer mode (ATM) is provided, including, receiving an AAL5 type ATM cell, separating the AAL5 type ATM cell into initial VP/VC and data, and generating an AAL2 CPS packet by allocating new VP/VC and CID to the separated data instead of the initial VP/VC, and generating an AAL2 ATM cell by multiplexing a plurality of AAL2 CPS packets.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

The present invention proposes a cell switching system and method using an AAL2/AAL5 converter. Generally, the signaling is divided into a first signaling for CID (channel identifier) allocation between AAL2 protocol and a second signaling for transferring a control signal required for an entire system. The second signaling for transferring a control signal required for an entire system is the AAL5 protocol.

Figure 3:
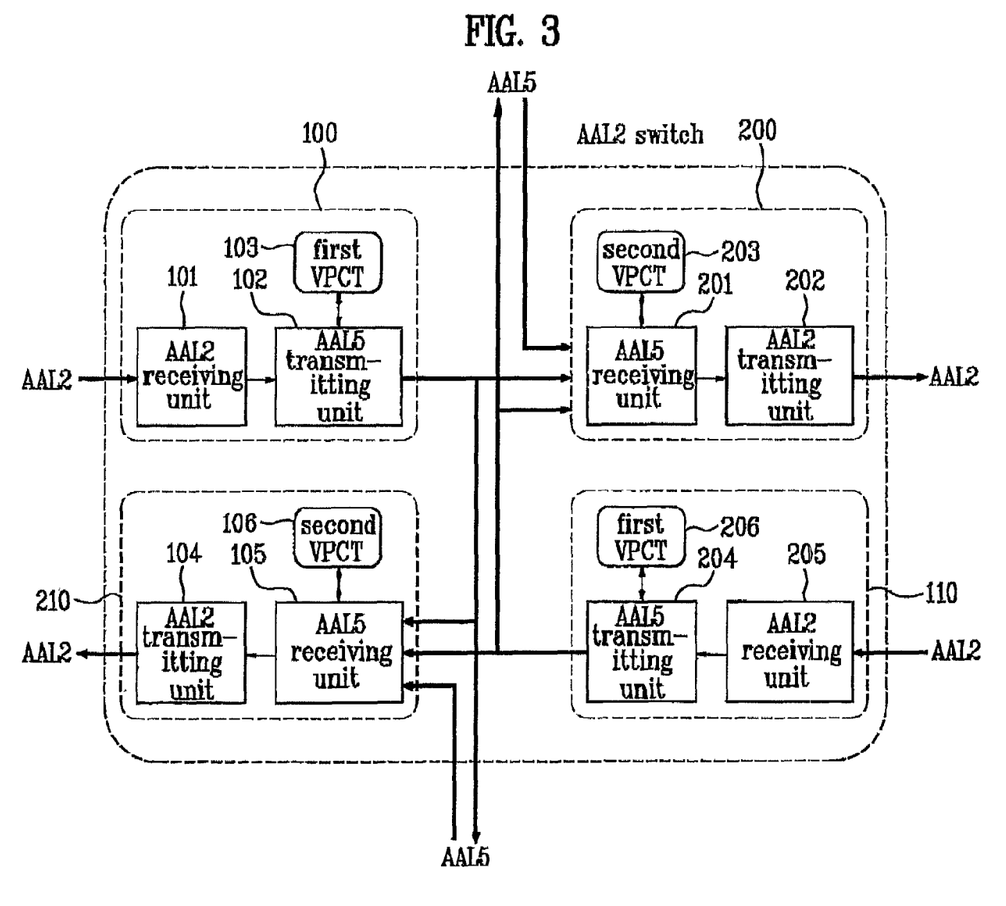
FIG. 3 is a diagram of a cell format converter, according to a preferred embodiment of the invention.

FIG. 3 is a block diagram of a cell format converter according to a preferred embodiment of the present invention. A cell format converter may include AAL2/AAL5 converters 100 and 110 converting an AAL2 cell into an AAL5 cell by multiplexing, and AAL5/AAL2 converters 200 and 210 converting the AAL5 cell into the AAL2 cell by multiplexing.

The AAL2/AAL5 converters 100 and 110 according to a preferred embodiment enable a loop-back operation by which AAL2 CPS packets may be switched at an AAL level so as to be outputted as AAL2 CPS packets. In addition, the AAL2/AAL5 converter 100 or 110 may realize a flexible switching system, which may output a single AAL5 ATM cell performing an ATM translation between AAL2 and AAL5 protocols.

The AAL2/AAL5 converters 100 and 110 preferably include AAL2 receiving units 101 and 205, AAL5 transmitting units 102 and 204, and first VPCTs (virtual path/virtual channel & channel identifier conversion tables) 103 and 206 coupled respectively to the AAL5 transmitting units 102 and 204, respectively.

The AAL5/AAL2 converters 200 and 210 may include AAL5 receiving units 201 and 105, AAL2 transmitting units 202 and 104, and second VPCTs 203 and 106 coupled to the AAL5 receiving units 201 and 105, respectively.

An AAL2 ATM cell processed according to the first VPCT 103 or 206 may be transformed into an AAL5 ATM cell, and may be subsequently processed according to the second VPCT 106 or 203.

A preferred operation in accordance with the aforementioned description and FIG. 3 may be as follows. First, in the AAL2/AAL5 converters 100 or 110, an ATM cell inputted to a random port may be multiplexed so as to be transferred to the AAL2 receiving unit 101 or 205. In this case, the ATM cell may be a cell of 53 bytes multiplexed as AAL2.

The AAL2 receiving unit 101 or 205 may separate the transferred ATM cell into AAL2 CPS packets corresponding respectively to VP (virtual path)/VC (virtual channel) and CID (channel identifier) and may then transfer the corresponding AAL2 CPS packets to the AAL5 transmitting unit 102 or 204 together with the respective VP/VC and CID.

The AAL5 transmitting unit 102 or 204 may convert the corresponding VP/VC and CID of the AAL2 CPS packets into new VP/VC by referring to the first VPCT 103 or 206, and may then output the new VP/VC and the AAL2 CPS packets as an independent AAL5 ATM cell.

The outputted AAL5 ATM cell may be demultiplexed so as to be transferred through a corresponding port, or may be inputted to the AAL5 receiving unit 201 or 105 to be transformed and demultiplexed into an AAL2 type ATM cell so as to be transferred through a corresponding port.

Meanwhile, in the AAL5/AAL2 converters 200 and 210, an AAL5 ATM cell inputted from one of the AAL2/AAL5 converters 100 or 110, or from an input port may be multiplexed so as to be transferred to the AAL5 receiving unit 201 or 105.

The AAL5 receiving unit 201 or 105 may separate the transferred AAL5 ATM cell into data corresponding to VP/VC respectively, and may allocate new VP/VC and CID to the respective VP/VC by referring to the second VPCT 203 or 106 in order to transfer the corresponding data together with the new allocated VP/VC and CID to the AAL2 transmitting unit 202 or 104.

The AAL2 transmitting unit 202 or 104 may generate an AAL2 CPS packet from the transferred new VP/VC, CID, and data. Moreover, the AAL2 transmitting unit 202 or 104 may multiplex the generated AAL2 CPS packet with another AAL2 CPS packet to generate an AAL2 ATM cell.

Such a generated AAL2 ATM cell may be transferred to an ATM cell multiplexer/demultiplexer (not shown in FIG. 3). Moreover, the ATM cell multiplexer/demultiplexer may demultiplex the received ATM cell so as to transmit the demultiplexed ATM cell to a corresponding port.

Speeds of the respective ports of the ATM cell multiplexer/demultiplexer may differ from each other. An overall speed may thus depend on a performance of the ATM cell multiplexer/demultiplexer and performances of the above-constructed AAL2/AAL5 and AAL5/AAL2 converters. Moreover, the number of switching-available VP/VC and CID's depend on capacities of the AAL2/AAL5 and AAL5/AAL2 converters.

Figure 5:
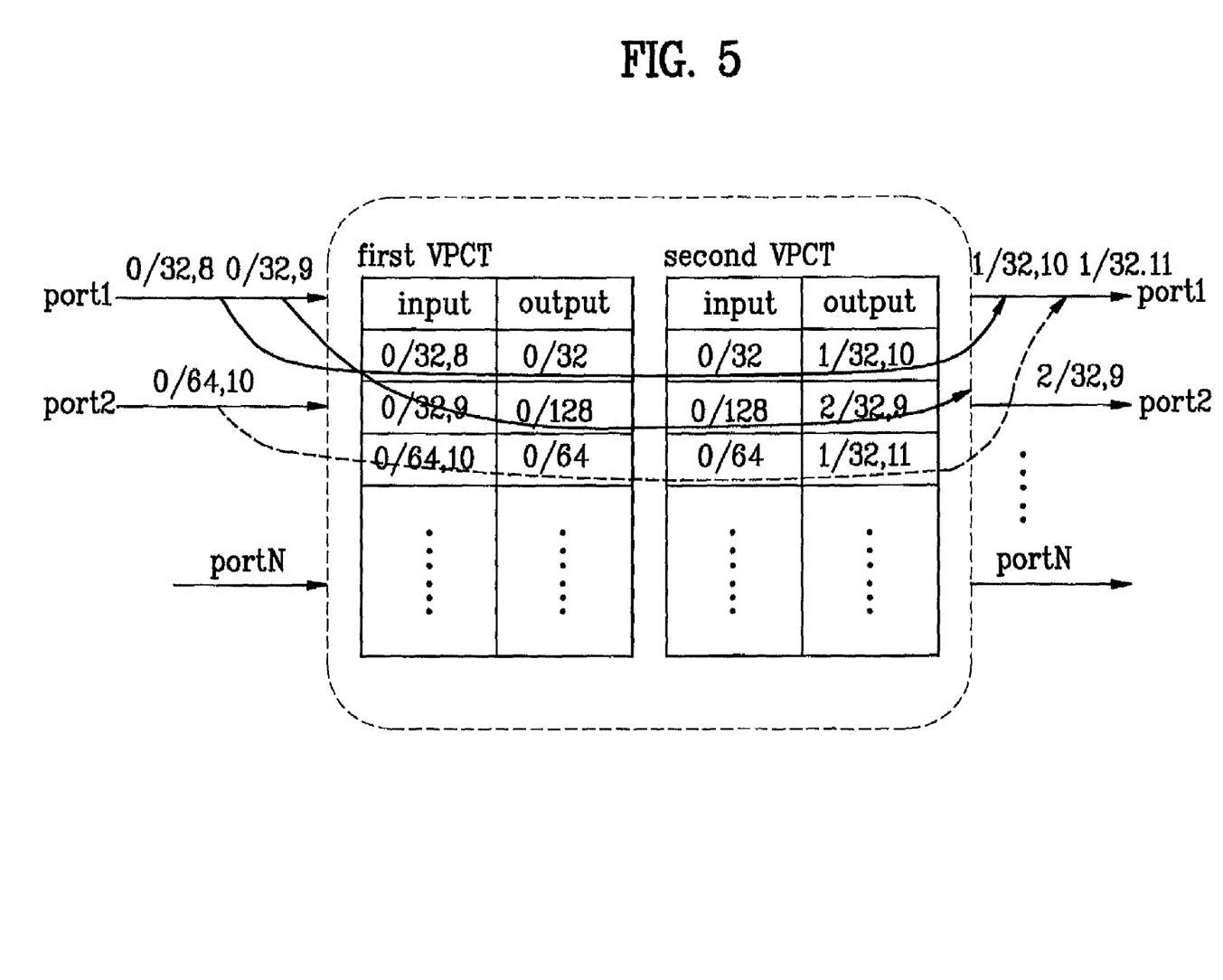
FIG. 5 is a diagram illustrating a switching example using the first and second VPCTs in FIG. 4A and FIG. 4B, respectively, according to a preferred embodiment of the invention.

In addition, a transferring direction of each of the AAL5 transmitting units 102 and 204 may be varied with the corresponding VP/VC, thereby realizing a loop-back function of a cell switching system according to the present invention, which is described in detail by referring to an example in FIG. 5.

Figure 4A:
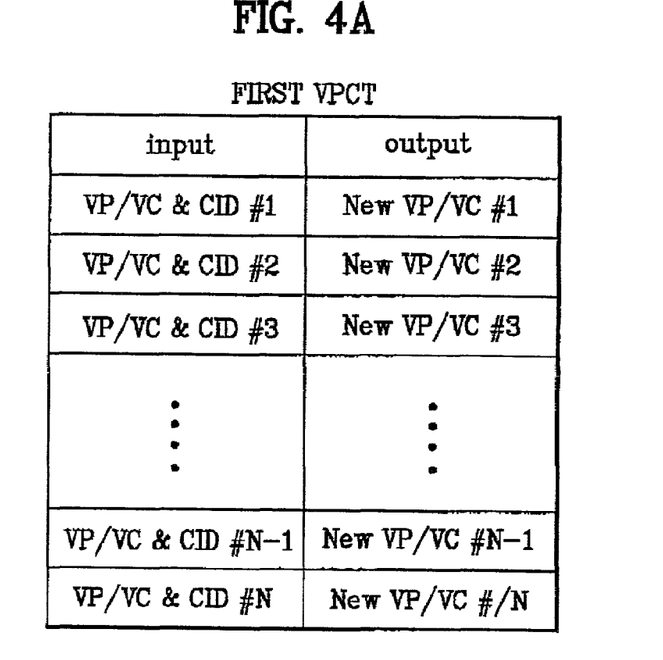
FIG. 4A is a drawing illustrating a first VPCT in FIG. 3 according to a preferred embodiment of the invention.
Figure 4B:
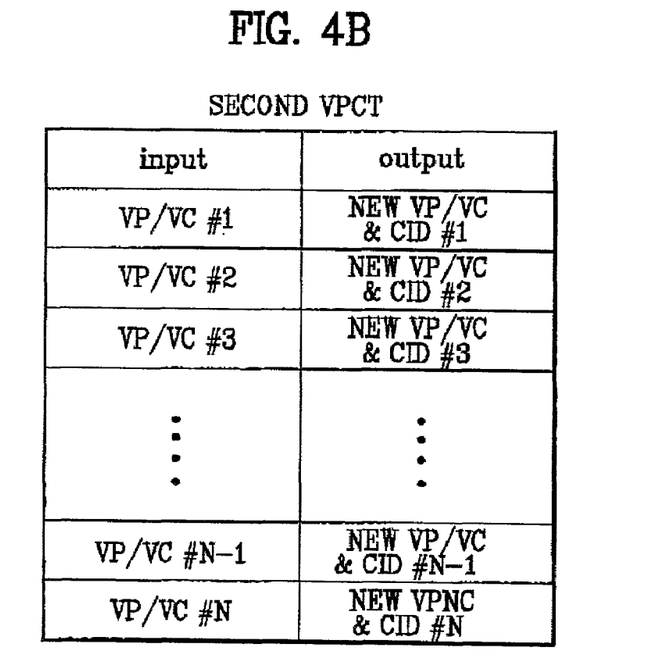
FIG. 4B is a drawing illustrating a second VPCT in FIG. 3, according to a preferred embodiment of the invention.

FIG. 4A is a drawing illustrating the first VPCT 103 and 206 in FIG. 3, and FIG. 4B is a drawing illustrating the second VPCT 106 and 203 in FIG. 3, according to a preferred embodiment of the invention.

FIG. 5 is a diagram illustrating a switching example using the first and second VPCTs in FIG. 4A and FIG. 4B, respectively, according to a preferred embodiment of the invention.

Referring to FIG. 4A, the first VPCT 103 or 206 may take VP/VC and CID corresponding to a random AAL2 CPS packet from the AAL5 transmitting unit 102 or 204 as an input, and may provide the AAL5 transmitting unit 102 or 204 with new VP/VC corresponding to this input.

Referring to FIG. 4B, the second VPCT 106 or 203 may take VP/VC corresponding to random data from the AAL5 receiving unit 105 or 201 as an input, and may provide the AAL5 receiving unit 105 or 201 with new VP/VC and CID corresponding to this input.

Hence, in N input ports as shown in FIG. 5, when a port 1 receives an ATM cell of which respective AAL2 CPS packets are multiplexed to a channel 8 and a channel 9 of an ATM cell of which VP/VC is 0/32, and a port 2 receives an ATM cell of which respective AAL2 CPS packet is multiplexed to a channel 10 of an ATM cell of which VP/VC is 0/64, the ATM cell multiplexer may transfer the received cells to the AAL2 receiving unit 101 or 205 in order of arrival.

Thereafter, the AAL2 receiving unit 101 or 205 may separate the AAL2 CPS packets from the channel 8 and channel 9 of the ATM cell having VP/VC of 0/32 and the AAL2 CPS packet from the channel 10 having VP/VC of 0/64 so as to transfer the separated packets to the AAL5 transmitting unit 102 or 204.

Then, the AAL5 transmitting unit 102 or 204 may generate an AAL5 ATM cell having VP/VC of 0/32 from the first transferred AAL2 CPS packet having VP/VC of 0/32, an AAL5 ATM cell having VP/VC of 0/128 from the second transferred AAL2 CPS packet having VP/VC of 0/32, and an AAL5 ATM cell having VP/VC of 0/64 from the third transferred AAL2 CPS packet having VP/VC of 0/64. These AAL5 ATM cells may then be transferred to the AAL5 receiving unit 201 or 105 from the AAL5 transmitting unit 102 or 204.

The AAL5 receiving unit 201 or 105 having received the AAL5 ATM cells may separate them into VP/VC and data respectively, and may allocate a VP/VC of 1/32 and CID of 10 to the AAL5 ATM cell having VP/VC of 0/32 so as to transfer the allocated AAL5 ATM cell to the AAL2 transmitting unit 202 or 104 together with the separated data. In like manner, the AAL5 receiving unit 201 or 105 may allocate a VP/VC of 2/32 and CID of 9 to the AAL5 ATM cell having a VP/VC of 0/128, and may further allocate a VP/VC of 1/32 and CID of 11 to the AAL5 ATM cell having a VP/VC of 0/64 so as to transfer the allocated respective VP/VC and CID and the corresponding data to the AAL2 transmitting unit 202 or 104.

The AAL2 transmitting unit 202 or 104 may generate single AAL2 CPS packets from the respective VP/VC, CID, and data. Moreover, in the AAL2 transmitting unit 202 or 104, the AAL2 CPS packets having VP/VC of 1/32 in the generated AAL2 CPS packets may be multiplexed to the corresponding CID of the ATM cell having a VP/VC of 1/32 and the AAL2 CPS packet having VP/VC of 2/32 may be generated as a single ATM cell. Such a generated cell may be demultiplexed by the demultiplexer so as to be transferred to a corresponding port.

Figure 6:
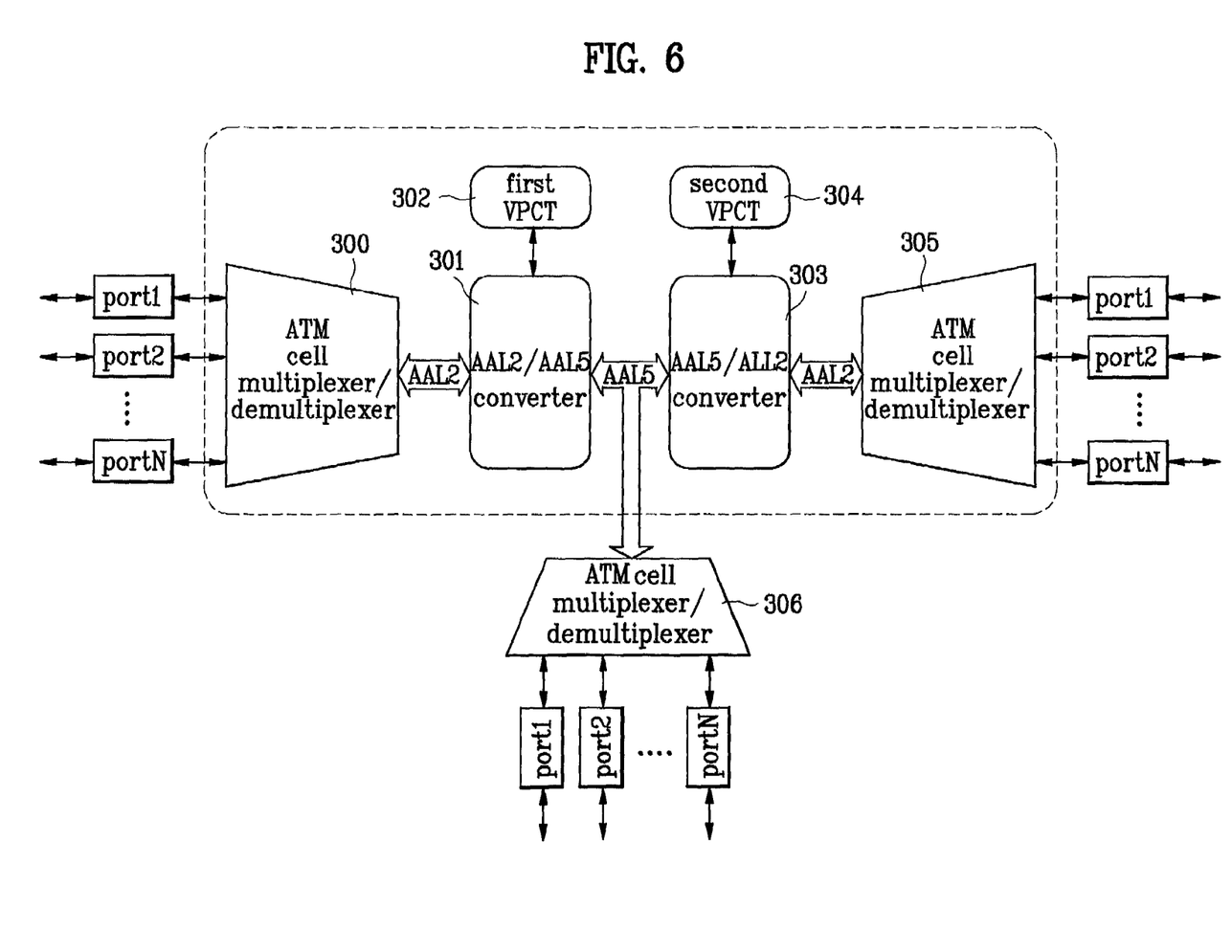
FIG. 6 is a diagram illustrating a cell switching system using the cell format converter in FIG. 3, according to a preferred embodiment of the invention.

FIG. 6 is a diagram illustrating a cell switching system using the cell format converter in FIG. 3, according to a preferred embodiment of the invention. As shown therein, a cell switching system may include a single AAL2/AAL5 converter and a single AAL5/AAL2 converter. In an alternative embodiment, the cell switching system may include a plurality of AAL2/AAL5 and AAL5/AAL2 converters.

A cell switching system according to the present invention may include ATM cell multiplexers/demultiplexers 300, 305 and 306, each of which multiplexes an ATM cell received from N ports thereof or demultiplexes an AAL2 ATM cell and an AAL5 ATM cell so as to transfer the demultiplexed cells to the respective ports, an AAL2/AAL5 converter 301 demultiplexing the multiplexed and inputted ATM cell so as to separate into AAL2 CPS packets and generate an independent AAL5 ATM cell by allocating a new VP/VC corresponding to the respective packets, a first VPCT 302 providing reference values for allocating new VP/VC to the separated AAL2 CPS packets respectively, an AAL5/AAL2 converter 303 separating the generated or externally-inputted AAL5 ATM cell into VP/VC and data and generating an AAL2 CPS packet by allocating a new VP/VC and CID to the separated VP/VC, and a second VPCT 304 providing reference values for allocating new VP/VC and CID to the separated data.

Accordingly, the present invention has many advantages. For example, the preferred embodiment improves system efficiency by removing processing overhead and time delays associated with switching at an ATM level. Moreover, a communication system using the AAL2 switch according to a preferred embodiment increases QoS, thereby improving system stability, communication performance, and communication speed. Further, the disclosed system and method of the invention enable a flexible ATM connection between an AAL2 protocol and an AAL5 protocol.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A cell switching system in a communication system using an asynchronous transfer mode (ATM), comprising:
a first converter configured to extract AAL2 common part sublayer (CPS) packets by demultiplexing a received AAL2 ATM cell, and generate a first AAL5 ATM cell in accordance with a first transforming information for the extracted AAL2 CPS packets; and
a second converter directly connected to the first converter and configured to generate an AAL2 CPS packet from the first AAL5 type ATM cell in accordance with a second transforming information and generate an output AAL2 ATM cell by multiplexing the generated AAL2 CPS packet with other AAL2 CPS packets.

2. The cell switching system of claim 1, wherein the first transforming information comprises virtual path/virtual channel (VP/VC) and channel identifier (CD) information, and wherein the second transforming information comprises VP/VC information.

3. The cell switching system of claim 1, further comprising:
a first table comprising the first transforming information to map respective input VP/VC and CD of AAL2 CPS packets extracted from the first converter to corresponding VP/VC of AAL5 ATM cells; and
a second table comprising the second transforming information to map respective input VP/VC of the AAL5 ATM cells to corresponding VP/VC and CID of AAL2 CPS packets.

4. The cell switching system of claim 1, wherein the second converter receives the AAL5 ATM cell from one of the first converter and an external source.

5. The cell switching system of claim 4, wherein the external source is an ATM cell multiplexer/demultiplexer.

6. The cell switching system of claim 1, wherein the first converter comprises:
an AAL2 receiving unit configured to receive the inputted ATM cell; and
an AAL5 transmitting unit, connected to the AAL2 receiving unit and the first table, and configured to output the generated AAL5 ATM cells, and wherein the second converter comprises,
an AAL5 receiving unit coupled to the second table and configured to separate the AAL5 ATM cell, the third VP/VC and data and allocate the fourth VP/VC and the second CID to the separated data, and
an AAL2 transmitting unit, connected to the AAL5 receiving unit and configured to generate the AAL2 CPS packet.

7. The cell switching system of claim 6, further comprising:
a third converter configured to extract AAL2 CPS packets by demultiplexing a received AAL2 ATM cell, and generate an AAL5 ATM cell in accordance with the first transforming information for the extracted AAL2 CPS packets; and
a fourth converter configured to generate an AAL2 CPS packet from the AAL5 ATM cell in accordance with the second transforming information and generate an AAL2 ATM cell by multiplexing the generated AAL2 CPS packet with other AAL2 CPS packets.

8. A cell switching system in a communication system using an asynchronous transfer mode (ATM), comprising:
a first converter configured to separate an inputted ATM cell into AAL2 common part sublayer (CPS) packets and first virtual path/virtual channel (VP/VC) and first channel identifier (CID), generate AAL5 ATM cells by allocating a second VP/VC to the separated AAL2 CPS packets, and having a first table provided with reference values for allocating the second VP/VC, wherein the first converter comprises:
an AAL2 receiving unit configured to receive the inputted ATM cell; and
an AAL5 transmitting unit, connected to the AAL2 receiving unit and the first table, and configured to output the generated AAL5 ATM cells; and
a second converter directly connected to the first converter and configured to separate one of the generated and externally-inputted AAL5 ATM cell into third VP/VC and data, generate an AAL2 CPS packet by allocating a fourth VP/VC and second CID to the separated data, generate an AAL2 ATM cell by multiplexing a plurality of AAL2 CPS packets, and having a second table provided with reference values for allocating the fourth VP/VC and second CID to the separated data, wherein the second converter comprises:
an AAL5 receiving unit coupled to the second table and configured to separate the AAL5 ATM cell, the third VP/VC and data and allocate the fourth VP/VC and the second CID to the separated data; and
an AAL2 transmitting unit, connected to the AAL5 receiving unit and configured to generate the AAL2 CPS packet.

9. The cell switching system according to claim 8, wherein the first table maps the respective first VP/VC and first CD of AAL2 CPS packets extracted from the first converter to second VP/VC.

10. The cell switching system according to claim 8, wherein the second table maps the respective third VP/VC of the AAL5 ATM cells to fourth VP/VC and second CID.

11. A cell switching system in a communication system using an asynchronous transfer mode (ATM), comprising:
a first converter configured to separate an inputted ATM cell into AAL2 common part sublayer (CPS) packets and first virtual path/virtual channel (VP/VC) and first channel identifier (CID), generate AAL5 ATM cells by allocating second VP/VC to the separated AAL2 CPS packets, and having a first table provided with first reference values for allocating the second VP/VC;
a second converter configured to separate one of the generated and externally-inputted AAL5 ATM cell into third VP/VC and data, generate an AAL2 CPS packet by allocating fourth VP/VC and second CID to the separated data, generate an AAL2 ATM cell by multiplexing a plurality of AAL2 CPS packets, and having a second table provided with second reference values for allocating fourth VP/VC and second CID to the separated data;
a third converter configured to separate the generated or externally-inputted AAL5 ATM cell into fifth VP/ye and data, generate an AAL2 CPS packet by allocating sixth VP/VC and third CID to the separated data, generate an AAL2 ATM cell by multiplexing AAL2 CPS packets generated by each user, and having a third table provided with third reference values for allocating the sixth VP/VC and the third CID to the separated data wherein the third reference values are attained by switching input/output from the second table; and
a fourth converter having an input directly connected to an output of the first converter and the third converter and configured to separate an inputted ATM cell into AAL2 CPS packets and seventh VP/VC and fourth CID, generate AAL5 ATM cells by allocating eighth VP/VC to the separated AAL2 CPS packets, provide the second and third converters with the AAL5 ATM cells or outputting the AAL5 ATM cells to an outside port, and having a fourth table provided with fourth reference values for allocating the eighth VP/VC, wherein the fourth reference values are attained by switching the input/output from the second table, and wherein the second converter has an input directly connected to the output of the first converter and the third converter.

12. The cell switching system according to claim 11, wherein the first converter comprises:
an AAL2 receiving unit configured to receive the inputted ATM cell; and
an AAL5 transmitting unit, connected to the AAL2 receiving unit and the first table, and configured to output the generated AAL5 ATM cells.

13. The cell switching system according to claim 12, wherein the second converter comprises:
an AAL5 receiving unit coupled to the second table and configured to separate the AAL5 ATM cell, the third VP/VC and data and allocate the fourth VP/VC and the second CID to the separated data; and
an AAL2 transmitting unit, connected to the AAL5 receiving unit and configured to generate the AAL2 CPS packet.

14. The cell switching system according to claim 11, wherein the first and third table maps respective VP/VC and CID of the separated AAL2 CPS packets to VP/VC of AAL5 ATM cells.

15. The cell switching system according to claim 14, wherein the second and fourth tables map respective VP/VC of the AAL5 ATM cells correspond to VP/VC and CID of AAL2 CPS packets.

16. A cell switching system in a communication system using an asynchronous transfer mode (ATM), comprising:
a first converter configured to separate an inputted first AAL2 ATM cell into AAL2 common part sublayer (CPS) packets and first virtual path/virtual channel (VP/VC) and first channel identifier (CID), generate an AAL5 ATM cell in accordance with the first VP/VC by allocating second VP/VC to the separated AAL2 CPS packets, and having a first table provided with reference values for allocating the second VP/VC;
a second converter directly connected to the first converter configured to separate the generated inputted AAL5 ATM cell into third VP/VC and data, generate an output AAL2 CPS packet by allocating fourth VP/VC and second CID to the separated data, generate second AAL2 ATM cell by multiplexing the output AAL2 CPS packet with at least one other AAL2 CPS packet, and having a second table provided with reference values for allocating the fourth VP/VC and second CID to the separated data; and
a multiplexer/demultiplexer configured to multiplex AAL2 ATM cells or AAL5 ATM cells inputted through corresponding ports so as to provide the first and second converters with the multiplexed cells and to demultiplex the generated AAL5 ATM cell and the second AAL2 ATM cell to perform the switching.

17. The cell switching system according to claim 16, wherein the first table maps respective first VP/VC and first CID of the separated AAL2 CPS packets to second VP/VC.

18. The cell switching system according to claim 16, wherein the second table maps the respective third VP/VC of the AAL5 ATM cells to fourth VP/VC and second CID.

19. A cell switching system in a communication system using an asynchronous transfer mode (ATM), comprising:
a first converter configured to separate an inputted ATM cell into AAL2 common part sublayer (CPS) packets and first virtual path/virtual channel (VP/VC) and first channel identifier (CID), generate AAL5 ATM cells by allocating a second VP/VC to the separated AAL2 CPS packets, and having a first table provided with first reference values for allocating the second VP/VC;
a second converter configured to separate one of the generated and externally-inputted AAL5 ATM cell into third VP/VC and data, generate an AAL2 CPS packet by allocating fourth VP/VC and second CID to the separated data, generate an AAL2 ATM cell by multiplexing a plurality of AAL2 CPS packets, and having a second table provided with second reference values for allocating the fourth VP/VC and second CID to the separated data;
a third converter configured to separate the generated or externally-inputted AAL5 ATM cell into fifth VP/VC and data, generate an AAL2 CPS packet by allocating sixth VP/VC and third CID to the separated data, generate an AAL2 ATM cell by multiplexing AAL2 CPS packets generated by each user, and having a third table provided with third reference values for allocating the sixth VP/VC and the third CID to the separated data wherein the third reference values are attained by switching input/output from the second table;
a fourth converter configured to separate an inputted ATM cell into AAL2 CPS packets and seventh VP/VC and fourth CID, generate AAL5 ATM cells by allocating eighth VP/VC and CID to the separated AAL2 CPS packets, provide the second and third converters with the AAL5 ATM cells or outputting the AAL5 ATM cells to an outside port, and having a fourth table provided with fourth reference values for allocating the eighth VP/VC wherein the fourth reference values are attained by switching the input/output from the second table, wherein an input of the second and fourth converters each has a direct connection, respectively, to an output of the first and third converters;
a first multiplex/demultiplexer configured to multiplex the AAL2 ATM cells inputted through corresponding ports so as to provide the second and fourth converter with multiplexed cells and to demultiplex the generated AAL2 ATM cells so as to output the demultiplexed cells to the corresponding ports;
a second multiplexer/demultiplexer configured to multiplex the AAL2 ATM cells inputted through corresponding ports so as to provide the first and third converters with the multiplexed cells and to demultiplex the generated AAL2 ATM cells so as to output the demultiplexed cells to the corresponding ports; and
a third multiplexer/demultiplexer connected to the direct connection and configured to multiplex AAL5 ATM cells inputted through corresponding ports so as to provide the second and fourth converters with the multiplexed cells and to demultiplex the generated AAL5 ATM cells to output the demultiplexed cells to the corresponding ports.

20. The cell switching system according to claim 19, wherein the first table maps respective VP/VC and CID of the separated AAL2 CPS packets to VP/VC of AAL5 ATM cells.

21. The cell switching system according to claim 19, wherein the second table maps respective VP/VC of the AAL5 ATM cells to VP/VC and CID of AAL2 CPS packets.

22. A method for switching cells in a communication system using an asynchronous transfer mode (ATM), comprising:
    extracting a first AAL2 common part sublayer (CPS) packets by demultiplexing a first AAL2 ATM cell;
    generating an AAL5 ATM cell in accordance with virtual path/virtual channel (VP/VC) and channel identifier (CID) transforming information for the extracted AAL2 CPS packets;
    generating a second AAL2 CPS packet from the AAL5 ATM cell in accordance with the VP/VC transforming information and generating a second AAL2 ATM cell by multiplexing the second AAL2 CPS packet with at least one other AAL2 CPS packets; and
    demultiplexing the generated AAL5 ATM cell and second AAL2 ATM cell to perform the switching.

23. The method of claim 22, wherein respective VP/VC and CID of the first AAL2 CPS packets correspond to VP/VC of the AAL5 ATM cell.

24. The method of claim 22, wherein respective VP/VC of the AAL5 ATM cells correspond to VP/VC and CID of the second AAL2 CPS packet.

25. The method of claim 22, wherein the first AAL2 ATM cell is received from an ATM cell multiplexer/demultiplexer.

26. A method for switching cells in a communication system using an asynchronous transfer mode (ATM), comprising:
    separating an inputted ATM cell into at least one first AAL2 common part sublayer (CPS) packets and first virtual path/virtual channel (VP/VC) and first channel identifier (CID);
    at least one of generating AAL5 ATM cells by allocating second VP/VC to the separated AAL2 CPS packets instead of the first VP/VC and first CID and receiving an external AAL5 ATM cell;
    separating the AAL5 ATM cell into second VP/VC and data; and
    generating a second AAL2 CPS packet by allocating third VP/VC and second CID to the separated data instead of the second VP/VC, and generating an AAL2 ATM cell by multiplexing a plurality of AAL2 CPS packets; and
    demultiplexing the generated AAL5 ATM cell and AAL2 ATM cell.

* * * * *